United States Patent [19]

Reeves

[11] 4,389,762
[45] Jun. 28, 1983

[54] METHOD OF MAKING A TRIMMER CAPACITOR

[75] Inventor: Jeffrey R. Reeves, Marshall, Ill.

[73] Assignee: TRW, Inc., Marshall, Ill.

[21] Appl. No.: 259,580

[22] Filed: May 1, 1981

Related U.S. Application Data

[63] Continuation of Ser. No. 70,102, Aug. 27, 1979, abandoned.

[51] Int. Cl.$^3$ .............................................. H01G 5/12
[52] U.S. Cl. ................................... 29/25.42; 361/295
[58] Field of Search ....................... 361/295; 29/25.42

[56] References Cited

U.S. PATENT DOCUMENTS

| | | | |
|---|---|---|---|
| 2,904,845 | 9/1959 | Sperry | 361/295 X |
| 3,000,592 | 9/1961 | Fahy | 151/7 X |
| 3,027,504 | 3/1962 | Clarke | . |
| 3,462,825 | 8/1969 | Pope | . |
| 3,938,012 | 2/1976 | Patti | 361/295 |
| 4,004,626 | 1/1977 | Biblin | 151/7 |

FOREIGN PATENT DOCUMENTS

1177251 9/1964 Fed. Rep. of Germany ...... 361/295

*Primary Examiner*—Elliot A. Goldberg

*Attorney, Agent, or Firm*—Dann, Dorfman, Herrell and Skillman

[57] ABSTRACT

A variable capacitor is formed by metalized bands around the outside surface of a rigid ceramic tube spaced from each other at opposite ends of the ceramic tube to form capacitor electrodes. An elongated tube of Teflon ® or other deformable resilient resinous material in tubular form is stretched to reduce its outer diameter from its normal diameter which is too large to accommodate the ceramic tube. The rigid dielectric tube is placed over the reduced-diameter liner. Tension is removed from the liner to afford relaxation of the liner, tending to return the liner to its original size and shape. Being confined by the ceramic tube, the liner is unable to do so, but securely engages the inside diameter of the ceramic tube. A threaded conductive piston, of a sufficient diameter to penetrate into and cause cold flow of the deformable liner material, is threaded into the liner, thereby removing air pockets and voids between the liner and ceramic. The variable capacitor thus formed preferably has an electrical connection between one plate of the capacitor and the piston to maintain the two at the same potential and suitable terminals attached by bands soldered directly to the electrodes of the capacitor.

4 Claims, 9 Drawing Figures

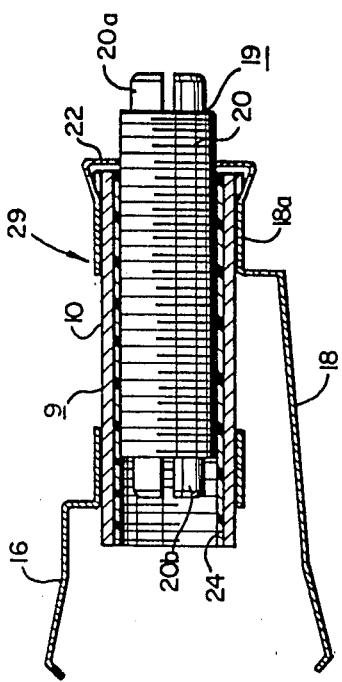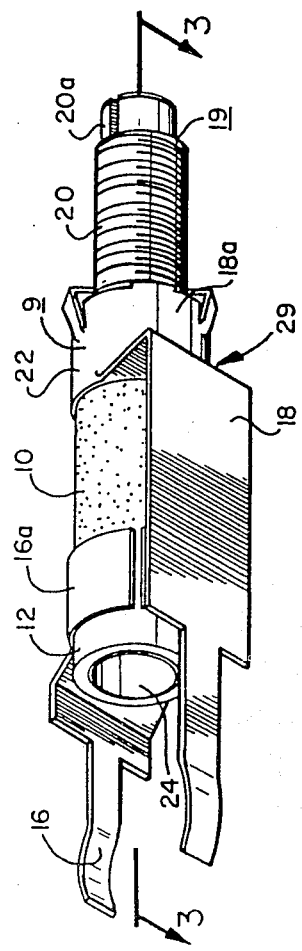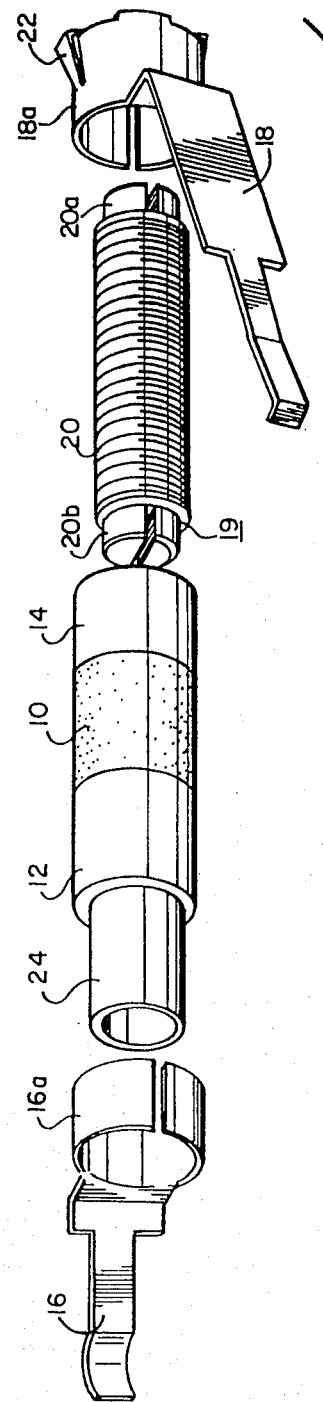

METHOD OF MAKING A TRIMMER CAPACITOR

This is a continuation of application Ser. No. 70,102 filed Aug. 27, 1979 now abandoned.

BACKGROUND OF THE INVENTION

1. Field of Invention

The present invention has to do with improvement of variable capacitors commonly referred to as "piston trimmers" and to a preferred method of achieving the structure of the improved capacitor. More specifically, the present invention relates to a new type of resilient, deformable, resinous, tubular liner between a rigid dielectric tube supporting axially spaced capacitor electrodes and a cylindrical threaded piston. The invention also relates to a preferred method of securely engaging the liner in position.

2. Description of the Prior Art

Variable capacitors of the piston trimmer type are well known in the prior art. Such devices have been characteristically composed of a molded tubular dielectric tubular body, commonly composed of polystyrene having a pair of terminals connected to axially spaced capacitor electrodes on the outside wall of the body. The body has been threaded internally and a threaded screw having matching threads moves a metallic piston within the tubular body by virtue of threaded engagement with the tubular body. In a typical construction, the conductive piston positioned within the tubular dielectric body is electrically connected to one of the pair of terminals, electrically connecting it to one of the capacitor plates or electrodes. The piston is axially moved within the tubular dielectric body like a screw using a screw driver slot in its end, and, as it moves, it varies the capacitance of the trimmer capacitor.

In the prior art, as recited in U.S. Pat. No. 3,938,012, a major problem with this type of piston trimmer has been unreliable and inaccurate capacitance value of the trimmer. The presence of air voids between the crest of the threads of the piston which had been a problem in prior designs was solved in part according to this patent by the use of a liner member provided by inserting a very thin sheet of deformable dielectric material, usually with a metallized surface for engagement by the threaded piston, between the piston and the tubular body. Because of the formation of the liner member from an essentially flat dielectric sheet rolled to conform to the space, an axial split between the edges of the dielectric material is frequently produced, thus introducing an air space or an air gap between the piston and the electrode of the opposite electrical potential. Also, the dielectric is usually quite thin, on the order of 0.005 inches, and damage to the dielectric due to its flat shape and misalignment of some sort within the rigid dielectric member is a possibility. Structural damage can have severe effects upon performance or render the capacitor inoperative, or at least inaccurate. Also, cavities between the piston threads and the dielectric material have remained a problem. Entrapment of air or foreign substances within these spaces or in the gap between the ends of the sheet may cause temporary or permanent alteration of the parameters of the device.

SUMMARY OF THE INVENTION

In accordance with the present invention, the structure of tubular body has been modified to a two-piece construction. The outer part is an unthreaded dielectric tube of rigid material, preferably of capacitor ceramic material, which allows variation in selection of electrical parameters. The ceramic material may be selected or treated so that metalized bands may be easily deposited about the outer circumference at both ends thereby forming capacitor plate or electrode areas which also serve as suitable soldering surfaces for the contact terminals.

In accordance with the present invention, the second member of the body is an intermediary or liner for the rigid dielectric tubular body, and is itself a tube composed of resilient, deformable resinous material, and preferably of polytetrafluoroethylene (such as Teflon ®). The liner must be sufficiently thick to allow the piston screw to form threads which are complementary to the piston screw threads in the deformable resilient material by cold flow. Preferably there is no cutting or threading operation performed upon either the rigid ceramic dielectric tube or the deformable liner prior to the assembly of the liner in the tube. Dimensions are selected such that the resilient, deformable tubular liner is securely engaged within the rigid dielectric tube, preferably throughout its length.

By the preferred process of the present invention, the external diameter of the liner is reduced by axially stretching it under axial tension to enable its insertion within the outer rigid dielectric tube. The external diameter is then allowed to approach its original condition by release of the tension on the liner after it has been inserted into the rigid dielectric tube. Introduction of the piston screw, particularly because self-forming threads are developed in the deformable material by cold flow as the piston is introduced, allows compression of the deformable resilient material and preferably excludes all air voids between the liner and the ceramic tube, and in any event minimizes the problems of prior art devices which are due to the presence of air spaces or air gaps. The resulting compression also securely engages the deformable resilient material with the internal diameter of the dielectric tube. The liner, using material such as Teflon ®, does not adversely affect the dielectric constant qualities offered by the capacitor ceramic. The deformable nature of the liner also permits variation not only to accommodate irregularities but also to accept out-of-roundness. Therefore, the need to provide ceramic tubes with a high precision or dimensional accuracy is eliminated and even the interior surface need not be polished smooth in order to achieve good contact with the deformable liner material. In short, the liner acts very much like a gasket which accommodates to slight imperfections in the tube and results in a device which has a tendency better to reject adverse effects from the surrounding environment.

The aforesaid advantages of the present invention allows production of a low cost reliable capacitor component, particularly useful to the automotive industry. Part of the low cost advantage stems from its ability to be mass-produced for automotive equipment. The variable capacitance provides a highly useful capacitance range with a good temperature coefficient and an improved quality factor, while at the same time keeping package size small and of standard dimensions.

More specifically, the capacitor of the present invention is a piston trimmer capacitor comprising a tubular body including rigid dielectric tube, such as capacitor ceramic, having circumferential bands of metalization of its opposite ends to provide spaced capacitor plates or electrodes on the outside wall of the tube. A resilient, deformable, tubular liner is provided within the rigid tube and a threaded conductive cylindrical piston is threaded into this liner. The capacitor electrodes have suitable terminals, and an electrical connection between one of the electrodes or terminals and the conductive plug is also desirable.

Also in accordance with the present invention, a preferred method of insertion of the tubular liner involves an axial stretching of a tube of resinous material and its insertion into the rigid dielectric tube while in stretched condition. Stretching reduces the outer diameter of the tubular liner, and when it is relaxed, the liner then expands into secure engagement with and conforms to the inner surface of the rigid tube. Thereafter, the threaded plug may be inserted without difficulty.

More specifically, the preferred method of the present invention involves selecting for the intermediate liner a resilient resinous material deformable by cold flow, which is of tubular form having an outer diameter too large to fit within the inner diameter of the dielectric tube. The tubular deformable material is preferably in the form of a length of tubing, and is axially stretched until it fits within the rigid dielectric tube. The stretched tubular resinous material is placed within the rigid dielectric tube along a substantial length of the rigid body. Then, the stretching of the deformable tubular material is released so that it tends to return to its former size and shape and is confined by the inner surface of the rigid tube.

BRIEF DESCRIPTION OF DRAWINGS

For a better understanding of the present invention, reference is made to the accompanying drawings in which:

FIG. 1 is a perspective view of the completed assembly of the variable capacitor means in accordance with the present invention;

FIG. 2 is an exploded view of the structure of FIG. 1 showing the elements of the capacitor disassembled and distributed along an axial path;

FIG. 3 is a longitudinal cross-sectional view illustrating the capacitor, taken on the line 3—3 of FIG. 1 but with the piston screw more fully inserted;

DESCRIPTION OF THE PREFERRED EMBODIMENTS

Figure 4:
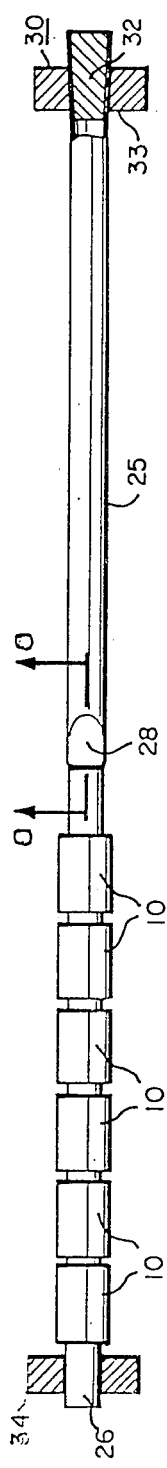
FIG. 4 is a side view of a preferred fixture used in practicing the method of the present invention in a preliminary arrangement.

Referring now to FIGS. 1 through 3, the capacitor of the present invention has a fixed body 9 and a displaceable piston 19. The assembled capacitor is designated 29. The body 9 comprises a rigid dielectric tube 10 of cylindrical form. Preferably, the tube is of capacitor ceramic material of the type which may be formulated to provide the desired electrical parameters and which may be appropriately surface-treated to accept solder plating 12 and 14 in circumferential annular bands around opposite ends of the tube. The bands may be otherwise metalized, such as by evaporation or other suitable techniques, either conventional or novel. These annular bands 12 and 14 effectively provide the fixed electrodes for the capacitor as well as conductors to which conductive leads 16 and 18 are attached. The leads may be of any appropriate conductive metal, such as copper or a copper alloy. The leads are conveniently formed integrally with bands 16a, 18a which may be soldered to the metalized surfaces 12 and 14, respectively. The metal contact terminals 16 and 18 are preferably formed of self-supporting conductive sheet material by conventional stamping to achieve the shapes shown or other shapes appropriate to a particular capacitor configuration. The leads or contact terminals 16 and 18 in the illustrated embodiment extend equidistantly beyond the same end of the tube and are parallel one another and serve to anchor the capacitor to the circuit board in a fixed position enabling axial adjustment of the piston relative thereto. In other embodiments, other lead or contact terminal configurations may be preferred, depending upon the circuit configuration for which they are designed.

In order to adjust capacitance in this type of capacitor, the movable piston 19 comprises a metallic screw provided with suitable thread means 20 displacable within the rigid tube 10. The ends 20a and 20b of the piston are provided with screwdriver slots to permit axial adjustment of the core within the tubular body by simple rotation of the piston about its axis. Preferably, a metallic conductive spring clip 22 is made integral with the metal contact terminal member 18, but it may be attached thereto with good electrical contact. The geometry of the clip 22 is such that it also makes good electrical contact with the threads 20 of the piston 19. Thus, the piston 19 and the metalized surface 14 as well as the metalized contact 18 are at a common electrical potential because of their interconnection.

It is necessary to provide the ceramic tube 10 with a suitable liner 24 so that the piston 19 can be threadably engaged with the tubular body 9. As explained above, it is important to avoid air pockets which may vary the effective capacitance as changes take place either by mechanical adjustment or otherwise. Therefore, in this case, the liner material is selected as polytetrafluoroethylene tubing sold commercially under the trademark Teflon ® by DuPont. The material can be other resinous deformable tubular materials, but it must have the property of resiliency, that is tending to return to its original size and shape when deformed, and, at the same time it must be capable of cold flow to accommodate the movement of a piston screw and to fill in air gaps along the threads of the screw as well as the irregularities on the interior of the ceramic tube. It should be noted that the threads 20 of the piston 19 are continuous and uninterrupted to avoid air gaps which might adversely affect the parameters of the capacitor.

In accordance with the present invention, the Teflon ® tubing is selected to be of a slightly larger outer diameter than the inner diameter of the ceramic tube so that it does not readily fit within the tube in its normal unstressed state. In order to allow it to be inserted within the tube, it is stretched axially and inserted within the tube. Then, when the stretching is relaxed, the Teflon ® tubing tends to resume its original shape. It is restrained from doing so by the inner surface of the rigid ceramic tubular member 10. But, because of its plastic deformable "flow properties" it assumes close conformity to the shape of the inner surface of the tube thereby squeezing air and air pockets out as it assumes that position. Preferably the action of the piston screw itself it used to make its own thread grooves in the Teflon ® liner by cold flow when the piston screw is inserted thereafter. In either event, the action of cold flow is to cause the deformable resilient liner under the pressure imposed by the piston screw, to fill the space between the tube and the screw and produce such cold flow that the threads formed in the liner 24 are precisely complementary to the threads 20 and extend continuously without interruption or air gaps. The piston 19 itself, characteristically, has somewhat smaller ends 20a and 20b and a larger outer diameter at the crest of its threads 20 than the inner diameter of the Teflon ® liner 24 when it is securely in place within the rigid ceramic tube 10. When threaded into the liner, the threads 20 of the piston 19 tend to effect radial expansion of the outer diameter of the liner and the aforedescribed cold flow which causes secure engagement between the liner 24 and the tube 10, and filling of the space formed by the threads of the piston.

Figure 5:
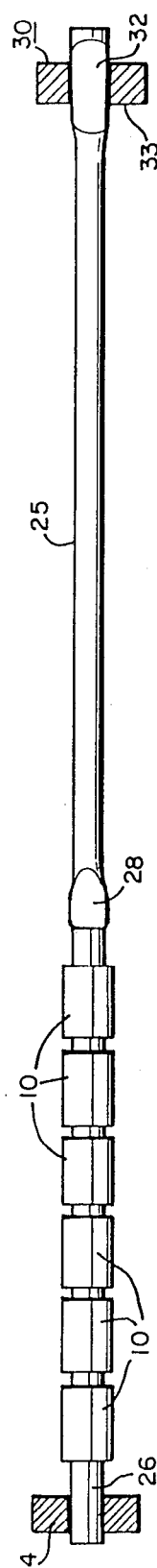
FIG. 5 is a similar view showing the stretching operation of the method of the invention.
Figure 6:
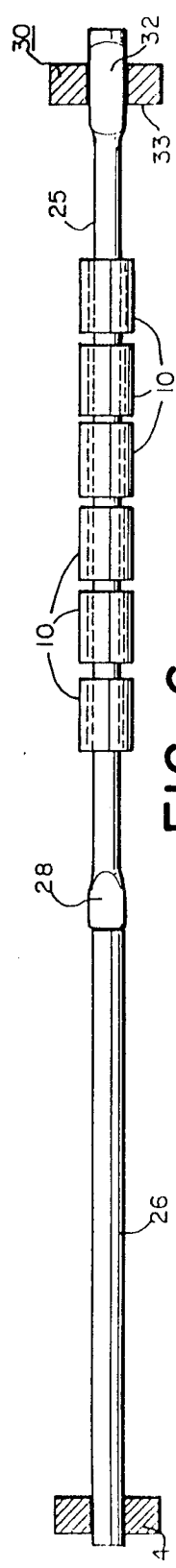
FIG. 6 is a similar view showing the assembly step of the process.

As a practical matter, means must be found for accomplishing the installation of the tubular liner in a convenient manner. The method for doing this is shown in FIGS. 4, 5 and 6 wherein there is illustrated a fixture designed for this purpose. The fixture consists of a rigid loading rod 26 and a plug 28, preferably of steel or other suitable material of a diameter less than the inner diameter of the tube 10 with the liner 24 in place and of a length sufficient to allow plurality of the rigid ceramic tubes 10 to be slid in place as shown in FIG. 4. This is done preferably by automatic means which need not be described because it can be done by any means, such as hand loading.

A length of the resilient, deformable liner tubing 25 is attached at one end of the rod 26 by the plug 28 having cooperating axially threaded portions 27. One end of the tubing 25 is engaged between the threaded elements 26 and 28, whereby the end of the liner tubing is clamped and held between the butted ends of the rod 26 and the shoulder of plug 28 as shown in FIG. 5. Clamping means 30 is provided at the opposite end of the tube and is effective to clamp the opposite end of the tubing 25 in place. Preferably, the clamping means comprises a tapered drawing pin 32 located inside of the liner tubing 25 and a collar 33 surrounding the tubing which receives the axial pressure and allows axial tension forces to be imposed to stretch the tubing 25.

Figure 7:
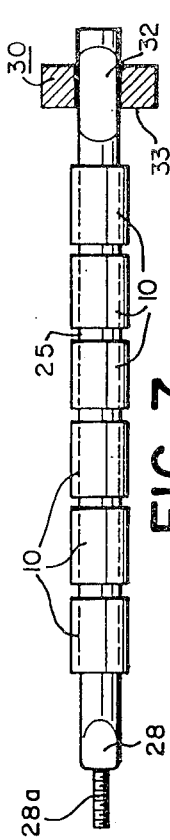
FIG. 7 represents the relaxation of tension, the final step of the process of liner insertion.
Figure 8:
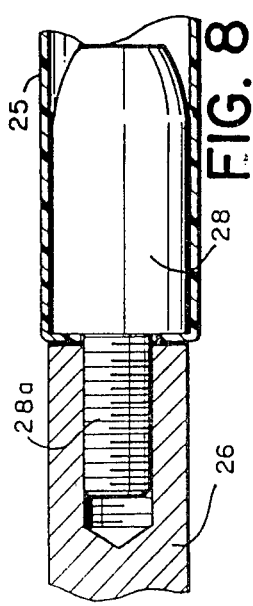
FIG. 8 is a detailed sectional view taken on the line 8—8 of FIG. 4 showing one portion of the fixture.

In accordance with the process, when the tubing 25 is in place between the plug 28 and the steel loading rod 26, axial tension forces may be applied by displacing the rod 26 to the left as indicated in FIG. 5. Extension of the tubing 25, for example by forcing a holder 34 for the rod 26 away from the collar 33, reduces its outside diameter. Then, as shown in FIG. 6 as the assembly is maintained under tension with the tubing in stretched condition, the ceramic tubular bodies 10 are strung onto the tubing by sliding them rightward past the plug 28 onto the reduced diameter of the tubing 25 and are positioned thereon with limited clearance between the individual tubes 10, as shown in FIG. 6. In FIG. 6, the tubes 10 are axially spaced, but in practice they are normally longitudinally abutting. Thereafter, the tension forces on the fixture are removed so that the resilience of the liner tube material causes the length of tubing 25 to tend to resume its original size and shape, as indicated in FIG. 7. Its flow properties cause the liner 24 to assume the shape of the inner diameter of the ceramic tube 10 and conform to any irregularities within the inside of the ceramic tube. The fixture is then removed and the liner tubing 25 between the ceramic tubes 10 may be cut to form an individual liner 24 within each ceramic tube 10. As illustrated in FIG. 7, the tubes 10 are axially spaced, but in practice the cutting tool relies on the resilience of the tubing to afford sufficient clearance for the cutting tool. Alternatively, cutting or other separation may be done while the tubing is still attached to the fixture. The liner 24 is trimmed substantially to the length of the ceramic tube 10 to provide a continuous insulating liner 24, preferably which extends the full length of the ceramic tube 10. While in some circumstances it is not necessary for the deformable tube 24 to extend the full length, in a practical assembly according to the invention the liner extends the full length of tubular body 10 but does not extend beyond the ends when trimmed. As an example, the ceramic tubes may be extruded with a nominal outside diameter of 0.175 inches (4.5 mm), a nominal inside diameter of 0.125 inches (3.2 mm) and a length of 0.387 inches (9.8 mm). A three-foot (914 mm) length of Teflon ® tubing having a wall thickness of 0.003 inches (0.08 mm) and a nominal o.d. of 0.135 inches (3.4 mm) is stretched 25% by the fixture to permit any number of tubes up to 93 to be strung onto the tubing with minimal space between the tubes. The tension is then released and the tubes are cut apart.

The assembly of the body 9 is completed by applying the contact terminals or leads 16 and 18 to metalized bands 12 and 14. Preferably, the bands 12 and 14 are solder-plated, and the leads are solder-coated so that the application of the leads may be accomplished by application of flux and insertion into a flow-solder oven. The heat applied in the oven not only effects the soldered connection of the leads 16 and 18 to the bands 12 and 14 but also operates to facilitate flow of the Teflon ® liner material to completely conform the outer surface of the liner 24 to the inner surface of the tube 10, filling cavities which may exist therein, and enhancing the secure engagement of the liner within the tube.

Following assembly of the body 9, the piston 19 is threadedly engaged within the inner diameter of the liner 24. Preferably, the thickness and deformability of the liner permits the threads 20 to form precisely complementary threads in the inner diameter of the liner 24 by simple axial screwing of the piston into the liner by means of its slotted end 20a or 20b. As the piston is advanced axially through the liner 24, the radial outward pressure exerted by the threads 20 expresses air bubbles from between the liner 24 and the tube 10, expelling such air axially from the remote end of the assembly. With a given thickness and deformability of the liner material, the threaded piston is selected so that the liner material substantially fills the root portions of the threads 20, avoiding entrapment of any air or other foreign matter between the piston and the liner. In the example described above, the threaded piston may have thread depth on the order of 0.008 inch (0.2 mm).

Figure 9:
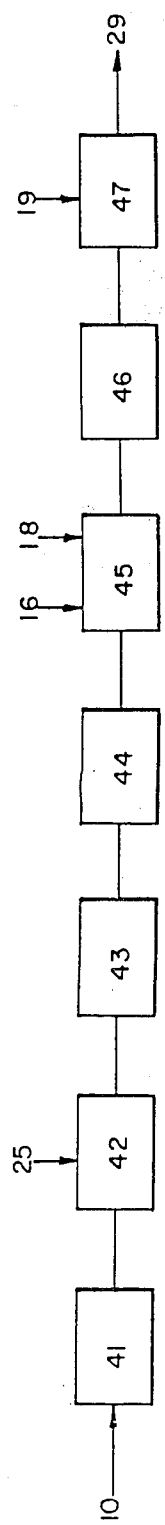
FIG. 9 is a block diagram of the process of making a capacitor in accordance with the invention.

In summary, the process for assembling the capacitor 29 involves the selection of suitable components, namely tubes 10, which may be simple extrusions, lining material 25 which may be standard Teflon ® tubing, leads 16 and 18, and pistons 19. As diagrammed in FIG. 9 in the first operation 41, the tubes 10 are strung onto the rod 26 either manually or automatically. In the second operation 42, the tubing 25 is clamped at one end by the plug 28 and at the other end by the clamp device 30. Axial tension is applied to generate stretch forces which reduce the outer diameter of the tubing 25. In the succeeding operation 43, the tubes 10 are displaced past the plug 28 onto the stretched tubing 25 and the tension is then relaxed to cause the outer diameter of the tubing to expand into secure engagement with the inner surfaces of the tubes. The tubing 25 may be severed, as diagrammed at 44 after unclamping the ends of the tubing. In operation 45, the leads 16 and 18 are applied to the electrodes of the tubes and a soldered connection is preferably completed in an oven as diagrammed at 46, the heat of the soldering oven enhancing the flow of the Teflon ® lining material into secure engagement with the tubes 10. The final operation 47 forms the threads in the liner 24 preferably by simple threaded engagement of the piston 19 therein. These simple steps complete the assembly of the capacitor 29.

Teflon ® is resistant to change in dimensions upon application of heat up to 500° F., so that when the capacitor is subjected to the soldering temperatures, it does not deform or permit lateral displacement of the piston within the liner which might alter the capacitance of the unit.

INDUSTRIAL APPLICABILITY

The present invention enables a highly economical production of piston type capacitors. The ceramic tube 10 may be formulated and dimensioned to provide the desired electrical parameters since the invention enables the use of tube produced by standard extrusion methods with no need for additional finishing processes which might alter the characteristics of the standard extruded tube. The invention provides a secure engagement of the Teflon ® liner within the ceramic tube, and formation of precisely complementary threads between the liner and the piston in an efficient and effective manner.

The capacitor 29 is particularly applicable to mass-produced automotive equipment. The package size is small and may be of standardized dimensions, and the desired electrical parameters may be achieved by selection of suitable capacitor ceramic material and suitable composition of the bands forming the electrodes.

A specific embodiment of the present invention has been described. It will be understood that individual pieces of Teflon ® tubing or other suitable tubular resilient deformable liner material may be individually stretched by other means so as to be insertable within a ceramic tube and any such means of accomplishing the result is intended to be within the scope and spirit of the present invention. Other modifications of the present invention will also occur to those skilled in the art, and all such modifications are intended to be within the scope and spirit of the present invention.

I claim:

1. The method of making a variable capacitor having a tubular body comprising a rigid dielectric tube supporting axially-spaced capacitor electrodes on the outer wall of the tube and a metallic threaded cylindrical piston whose outer diameter is threaded and slightly smaller than the inner diameter of the tube, said body having an air-excluding intermediate liner for location between the tube and the piston comprising;

selecting for the intermediate liner a resilient resinous material deformable by cold flow and resistant to change in dimension upon application of heat below 500° F., said material being of tubular form having an outer diameter too large to fit within the inner diameter of the dielectric tube, axially stretching the tubular deformable material to reduce its outer diameter until its outer diameter fits within the rigid dielectric tube, positioning the stretched tubular resinous material within the rigid dielectric tube along a substantial length of the rigid body, and releasing the stretching forces on the tubular deformable material so that it tends to return to its former size and shape and is confined by the inner diameter of the rigid tube and conforms to the inner surface thereof, and introducing said threaded metallic piston by threading the piston into the liner to deform the liner material by cold-flow and to form threads in said material precisely complementary to the threads of the metallic piston, and making electrical contact between said piston and one of said electrodes.

2. The method of claim 1 in which said axial stretching of the resinous material is accomplished by providing a fixture having a rod adapted to engage within the tube, slidably engaging at least one tube on said rod, attaching one end of the tubular resinous material to one end of said rod, using said rod to apply axial tension to the tubular resinous material at the attached end to elongate the tubular material, and sliding the at least one rigid dielectric tube from said rod past said one end and over the stretched tubular resinous material.

3. The method of claim 1 in which a plurality of rigid dielectric tubes are slidably engaged on the rod, and are slid in succession from said rod over the stretched deformable resinous material so that when the stretching forces are released, the tubes are securely engaged in axially aligned relation on said tubular resinous material, and severing the deformable tubular material between the rigid dielectric tubes to form a plurality of variable capacitor bodies.

4. The method of claim 1 including the preparatory step of providing metalized surfaces in annular bands on said dielectric tube by deposition prior to positioning said tubular material within the tube, and, following the release of the stretching forces, soldering terminals to said bands in an oven, the heat of said oven facilitating flow of said resinous material into secure engagement with the inner surface of said tube.

* * * * *